US012769060B2

(12) United States Patent
Kopp et al.

(10) Patent No.: US 12,769,060 B2
(45) Date of Patent: Oct. 20, 2026

(54) MULTICORE FIBER ATTENUATOR

(71) Applicant: Chiral Photonics, Inc., Pine Brook, NJ (US)

(72) Inventors: Victor Il'ich Kopp, Fair Lawn, NJ (US); Jing Zhang, Union, NJ (US); Jongchul Park, Lake Hiawatha, NJ (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 274 days.

(21) Appl. No.: 18/590,259

(22) Filed: Feb. 28, 2024

(65) Prior Publication Data

US 2024/0385380 A1 Nov. 21, 2024

Related U.S. Application Data

(60) Provisional application No. 63/502,834, filed on May 17, 2023.

(51) Int. Cl.
*G02B 6/26* (2006.01)
*G02B 6/02* (2006.01)
*G02B 6/14* (2006.01)

(52) U.S. Cl.
CPC ......... *G02B 6/266* (2013.01); *G02B 6/02042* (2013.01); *G02B 6/14* (2013.01)

(58) Field of Classification Search
CPC ...................................................... G02B 6/266
See application file for complete search history.

(56) References Cited

U.S. PATENT DOCUMENTS

| | | | |
|---|---|---|---|
| 6,396,859 | B1 | 5/2002 | Kopp et al. |
| 6,404,789 | B1 | 6/2002 | Kopp et al. |
| 6,411,635 | B1 | 6/2002 | Kopp et al. |
| 6,671,293 | B2 | 12/2003 | Kopp et al. |
| 6,678,297 | B2 | 1/2004 | Kopp et al. |
| 6,721,469 | B2 | 4/2004 | Kopp et al. |
| 6,741,631 | B2 | 5/2004 | Kopp et al. |

(Continued)

FOREIGN PATENT DOCUMENTS

| | | |
|---|---|---|
| CN | 101419310 | 4/2009 |
| WO | WO 2002/073247 A2 | 9/2002 |

(Continued)

OTHER PUBLICATIONS

International Search Report and Written Opinion for International Application No. PCT/US2024/028948 dated Aug. 28, 2024; 8 pages.

*Primary Examiner* — Lisa M Caputo
(74) *Attorney, Agent, or Firm* — Knobbe, Martens, Olson & Bear, LLP

(57) ABSTRACT

A multicore fiber (MCF) optical attenuator (MCF-ATT) can be configured to attenuate light traveling from at least one core of a first MCF to at least one core of a second MCF at least at one wavelength W−1. The MCF-ATT can include a plurality of optical waveguides and an attenuating section within the plurality of optical waveguides. The attenuating section can include a distorted portion of the plurality of optical waveguides. The distorted portion can be configured to couple at least one propagating optical mode with at least one radiation mode at the wavelength W−1.

25 Claims, 3 Drawing Sheets

(56) References Cited

U.S. PATENT DOCUMENTS

| | | | |
|---|---|---|---|
| 6,744,943 | B2 | 6/2004 | Kopp et al. |
| 6,792,169 | B2 | 9/2004 | Kopp et al. |
| 6,839,486 | B2 | 1/2005 | Kopp et al. |
| 6,875,276 | B2 | 4/2005 | Shibayev et al. |
| 6,891,992 | B2 | 5/2005 | Kopp et al. |
| 6,925,230 | B2 | 8/2005 | Kopp et al. |
| 7,009,679 | B2 | 3/2006 | Kopp et al. |
| 7,095,911 | B2 | 8/2006 | Kopp et al. |
| 7,142,280 | B2 | 11/2006 | Kopp et al. |
| 7,242,702 | B2 | 7/2007 | Kopp et al. |
| 7,308,173 | B2 | 12/2007 | Kopp et al. |
| 7,463,800 | B2 | 12/2008 | Kopp et al. |
| 7,983,515 | B2 | 7/2011 | Zhang et al. |
| 8,218,921 | B2 | 7/2012 | Kopp et al. |
| 8,326,099 | B2 | 12/2012 | Singer et al. |
| 8,457,456 | B2 | 6/2013 | Kopp et al. |
| 8,463,094 | B2 | 6/2013 | Kopp et al. |
| 8,712,199 | B2 | 4/2014 | Kopp et al. |
| 8,948,547 | B2 | 2/2015 | Kopp |
| 9,766,407 | B2 | 9/2017 | Weiner et al. |
| 9,810,845 | B2 | 11/2017 | Kopp |
| 9,817,191 | B2 | 11/2017 | Kopp et al. |
| 9,851,510 | B2 | 12/2017 | Kopp |
| 9,857,536 | B2 | 1/2018 | Kopp et al. |
| 9,885,825 | B2 | 2/2018 | Kopp |
| 9,921,355 | B2 | 3/2018 | Weiner et al. |
| 9,983,362 | B2 | 5/2018 | Kopp et al. |
| 10,078,019 | B2 | 9/2018 | Kopp et al. |
| 10,101,536 | B2 | 10/2018 | Kopp et al. |
| 10,126,494 | B2 | 11/2018 | Kopp |
| 10,197,736 | B2 | 2/2019 | Kopp |
| 10,323,227 | B2 | 6/2019 | Majeed et al. |
| 10,481,324 | B2 | 11/2019 | Churikov et al. |
| 10,502,898 | B2 | 12/2019 | Kopp |
| 10,564,348 | B2 | 2/2020 | Kopp et al. |
| 10,564,360 | B2 | 2/2020 | Kopp et al. |
| 10,761,271 | B2 | 9/2020 | Kopp |
| 10,835,155 | B2 | 11/2020 | Kopp et al. |
| 10,914,891 | B2 | 2/2021 | Kopp |
| 11,022,762 | B2 | 6/2021 | Singer et al. |
| 11,156,781 | B2 | 10/2021 | Kopp et al. |
| 11,609,376 | B2 | 3/2023 | Kopp et al. |
| 11,966,091 | B2 | 4/2024 | Kopp et al. |
| 2002/0003827 | A1 | 1/2002 | Genack et al. |
| 2002/0069676 | A1 | 6/2002 | Kopp et al. |
| 2002/0071881 | A1 | 6/2002 | Kopp et al. |
| 2002/0118710 | A1 | 8/2002 | Kopp et al. |
| 2002/0172461 | A1 | 11/2002 | Singer et al. |
| 2003/0118285 | A1 | 6/2003 | Kopp et al. |
| 2004/0062475 | A1 | 4/2004 | Popovich et al. |
| 2004/0145704 | A1 | 7/2004 | Kopp et al. |
| 2005/0226560 | A1 | 10/2005 | Kopp et al. |
| 2007/0104421 | A1 | 5/2007 | Hendriksson et al. |
| 2008/0098772 | A1 | 5/2008 | Kopp et al. |
| 2009/0324159 | A1 | 12/2009 | Kopp et al. |
| 2010/0002983 | A1 | 1/2010 | Kopp et al. |
| 2010/0073676 | A1 | 3/2010 | Sezerman et al. |
| 2010/0158438 | A1 | 6/2010 | Churikov et al. |
| 2011/0292676 | A1 | 12/2011 | Weiner et al. |
| 2011/0293219 | A1 | 12/2011 | Weiner et al. |
| 2012/0257857 | A1 | 10/2012 | Kopp et al. |
| 2013/0016742 | A1 | 1/2013 | Sakamoto |
| 2013/0121641 | A1 | 5/2013 | Singer et al. |
| 2013/0188174 | A1 | 7/2013 | Kopp et al. |
| 2013/0188175 | A1 | 7/2013 | Kopp et al. |
| 2013/0216184 | A1 | 8/2013 | Kopp et al. |
| 2021/0057869 | A1 * | 2/2021 | Takeshita ............ H01S 3/06737 |
| 2021/0263217 | A1 | 8/2021 | Kopp et al. |
| 2023/0208546 | A1 | 6/2023 | Kopp et al. |
| 2024/0219661 | A1 | 7/2024 | Kopp et al. |
| 2025/0264682 | A1 | 8/2025 | Kopp et al. |

FOREIGN PATENT DOCUMENTS

| | | | |
|---|---|---|---|
| WO | WO 2006/046947 | A2 | 5/2006 |
| WO | WO 2008/080174 | A1 | 7/2008 |
| WO | WO 2009/158661 | A2 | 12/2009 |
| WO | WO 2010/009101 | A2 | 1/2010 |
| WO | WO 2010/071861 | A2 | 6/2010 |
| WO | WO 2015/009756 | A1 | 1/2015 |
| WO | WO 2017/053479 | A1 | 3/2017 |
| WO | WO 2017/100667 | A1 | 6/2017 |
| WO | WO 2018/085435 | A1 | 5/2018 |
| WO | WO 2018/227008 | A1 | 12/2018 |
| WO | WO 2020/068695 | A1 | 4/2020 |
| WO | WO 2020/077285 | A1 | 4/2020 |
| WO | WO 2021/076752 | A1 | 4/2021 |
| WO | WO 2022/170205 | A1 | 8/2022 |
| WO | WO 2024/086536 | A1 | 4/2024 |
| WO | WO 2024/238392 | | 11/2024 |

* cited by examiner

MULTICORE FIBER ATTENUATOR

CROSS-REFERENCE TO RELATED APPLICATIONS

This application claims the benefit of priority to U.S. Provisional Application No. 63/502,83 , entitled "MULTICORE FIBER ATTENUATOR," filed May 17, 2023, which is incorporated in its entirety by reference herein.

BACKGROUND

Field

This disclosure relates generally to optical components such as multicore fiber attenuators.

Description of the Related Art

Multiple fiber-based components are used to support the multicore fiber infrastructure. In addition to fanouts, combiners, and wavelength-division multiplexing (WDM) components, multicore fiber attenuators are important for multicore fiber network deployment.

SUMMARY

Example implementations described herein have innovative features, no single one of which is indispensable or solely responsible for their desirable attributes. Without limiting the scope of the claims, some of the advantageous features will now be summarized.

Example Set I

1. A multicore fiber optical attenuator for optical attenuation of light in a plurality of optical fiber cores of multicore optical fibers carrying light at least at one wavelength W−1, comprising:
   - an elongated optical element having first and second ends coupled with said plurality of optical fiber cores of multicore optical fibers, comprising:
   - a plurality of optical waveguides connecting said first and second ends,
   - with an attenuating section therebetween,
   - wherein said optical waveguides are capable of supporting at least one propagating optical mode at said wavelength W−1, and at least one radiation mode at said wavelength W−1,
   - wherein said attenuating section comprises a distorted optical waveguide capable of coupling at least one said propagating optical mode with said at least one radiation mode at said wavelength W−1.
2. The multicore fiber optical attenuator of example 1, wherein said attenuating section is a portion of a multicore fiber distorted by at least one of application of heat and mechanical manipulation.
3. The multicore fiber optical attenuator of example 2, wherein said mechanical manipulation is at least one of fiber pulling, fiber compression, fiber twist, fiber rotation, fiber shift along the fiber axis, and fiber shift perpendicular to the fiber axis.
4. The multicore fiber optical attenuator of example 2, wherein said application of heat is one of pulsed and continuous heat.
5. The multicore fiber optical attenuator of example 1, wherein said radiation mode radiates from one of said optical waveguides over a scattering distance, wherein said scattering distance is one of less than 5 mm, less than 100 mm, less than 500 mm, longer than 5 mm, longer than 10 mm, longer than 50 mm, and longer than 100 mm.
6. The multicore fiber optical attenuator of example 1, wherein said attenuating section provides substantially uniform attenuation across said plurality of optical fiber cores while substantially preserving crosstalk, polarization-dependent loss, and/or return loss.
7. The multicore fiber optical attenuator of example 1, wherein said attenuating section provides substantially non-uniform attenuation across said plurality of optical fiber cores while substantially preserving crosstalk, polarization-dependent loss, and/or return loss.
8. The multicore fiber optical attenuator of example 1, wherein said attenuating section comprises a MCF-MCF splice.
9. The multicore fiber optical attenuator of example 1, wherein said attenuating section comprises a continuous section of a multicore fiber.
10. The multicore fiber optical attenuator of example 2, wherein said heat is generated by one of an electrical arc discharge, electric resistive heater, and laser.
11. The multicore fiber optical attenuator of example 1, wherein said at least one radiation mode is absorbed by a fiber coating.
12. The multicore fiber optical attenuator of example 2, wherein said attenuating section is a portion of a multicore fiber distorted by application of heat.
13. The multicore fiber optical attenuator of example 2, wherein said attenuating section is a portion of a multicore fiber distorted by application of mechanical manipulation.
14. The multicore fiber optical attenuator of example 13, wherein said mechanical manipulation is at least one of fiber pulling, fiber compression, fiber twist, fiber rotation, fiber shift along the fiber axis, and fiber shift perpendicular to the fiber axis.
15. The multicore fiber optical attenuator of example 5, wherein said radiation mode radiates from one of said optical waveguides over a scattering distance, wherein said scattering distance is less than 5 mm.
16. The multicore fiber optical attenuator of example 5, wherein said radiation mode radiates from one of said optical waveguides over a scattering distance, wherein said scattering distance is less than 500 mm.
17. The multicore fiber optical attenuator of example 5, wherein said radiation mode radiates from one of said optical waveguides over a scattering distance, wherein said scattering distance is longer than 5 mm and less than 500 mm.
18. The multicore fiber optical attenuator of example 5, wherein said radiation mode radiates from one of said optical waveguides over a scattering distance, wherein said scattering distance is longer than 100 mm and less than 500 mm.
19. The multicore fiber optical attenuator of example 6, wherein said attenuating section provides substantially uniform attenuation across said plurality of optical fiber cores while substantially preserving crosstalk.
20. The multicore fiber optical attenuator of example 19, wherein the crosstalk is not increased more than 3 dB.
21. The multicore fiber optical attenuator of example 6, wherein said attenuating section provides substantially uniform attenuation across said plurality of optical fiber cores while substantially preserving polarization-dependent loss.

22. The multicore fiber optical attenuator of example 21, wherein the polarization-dependent loss is not increased more than 0.1 dB.
23. The multicore fiber optical attenuator of example 6, wherein said attenuating section provides substantially uniform attenuation across said plurality of optical fiber cores while substantially preserving return loss.
24. The multicore fiber optical attenuator of example 23, wherein the return loss is not reduced more than 2 dB.
25. The multicore fiber optical attenuator of example 7, wherein said attenuating section provides substantially non-uniform attenuation across said plurality of optical fiber cores while substantially preserving crosstalk.
26. The multicore fiber optical attenuator of example 25, wherein the crosstalk is not increased more than 3 dB.
27. The multicore fiber optical attenuator of example 7, wherein said attenuating section provides substantially non-uniform attenuation across said plurality of optical fiber cores while substantially preserving polarization-dependent loss.
28. The multicore fiber optical attenuator of example 27, wherein the polarization-dependent loss is not increased more than 0.1 dB.
29. The multicore fiber optical attenuator of example 7, wherein said attenuating section provides substantially non-uniform attenuation across said plurality of optical fiber cores while substantially preserving return loss.
30. The multicore fiber optical attenuator of example 29, wherein the return loss is not reduced more than 2 dB.
31. The multicore fiber optical attenuator of example 1, wherein said attenuating section is a helical structure having helical pitch and structure length.
32. The multicore fiber optical attenuator of example 31, wherein said helical structure has said pitch optimized to minimize wavelength dependent loss.
33. The multicore fiber optical attenuator of example 32, wherein said helical structure has said structure length optimized to achieve desired optical loss.

Example Set II

1. A multicore fiber optical attenuator configured to attenuate light traveling from at least one optical fiber core of a plurality of optical fiber cores of a first multicore optical fiber to at least one optical fiber core of a plurality of optical fiber cores of a second multicore optical fiber at least at one wavelength W−1, the multicore fiber optical attenuator comprising:
   an elongated optical element having a first end and a second end, the first end configured to be optically coupled with said plurality of optical fiber cores of the first multicore optical fiber and the second end configured to be optically coupled with said plurality of optical fiber cores of the second multicore optical fiber, said elongated optical element comprising:
   a plurality of optical waveguides; and
   an attenuating section within the plurality of optical waveguides,
   wherein said plurality of optical waveguides comprises a plurality of optical fiber cores configured to have at least one propagating optical mode at said wavelength W−1, and at least one of a radiation mode or higher order mode at said wavelength W−1,
   wherein said attenuating section comprises a distorted portion of the plurality of optical waveguides, said distorted portion configured to couple said at least one propagating optical mode with said at least one of the radiation mode or higher order mode at said wavelength W−1.
2. The multicore fiber optical attenuator of example 1, wherein said first end of said elongated optical element is configured to be optically coupled with each of said plurality of optical fiber cores of the first multicore optical fiber and said second end of said elongated optical element is configured to be optically coupled with each of said plurality of optical fiber cores of the second multicore optical fiber.
3. The multicore fiber optical attenuator of any of examples 1-2, wherein said distorted portion is configured to couple said at least one propagating optical mode with said radiation mode.
4. The multicore fiber optical attenuator of any of examples 1-3, wherein said at least one propagating optical mode comprises a lowest order mode, and wherein said distorted portion is configured to couple said lowest order mode with said higher order mode, and wherein said distorted portion is further configured to scatter said higher order mode.
5. The multicore fiber optical attenuator of any of examples 1-4, wherein said attenuating section provides substantially uniform attenuation across said plurality of optical fiber cores of said plurality of optical waveguides.
6. The multicore fiber optical attenuator of any of examples 1-4, wherein said attenuating section provides non-uniform attenuation across said plurality of optical fiber cores of said plurality of optical waveguides.
7. The multicore fiber optical attenuator of any of examples 1-6, wherein said attenuating section comprises a multicore optical fiber-multicore optical fiber splice.
8. The multicore fiber optical attenuator of any of examples 1-6, wherein said attenuating section comprises a continuous section of a multicore optical fiber.
9. The multicore fiber optical attenuator of any of examples 1-8, wherein said distorted portion is configured such that said at least one of the radiation mode or higher order mode is scattered and absorbed by a fiber coating.
10. The multicore fiber optical attenuator of any of examples 1-9, wherein said at least one of the radiation mode or higher order mode radiates from one of said plurality of optical waveguides over a scattering distance, wherein said scattering distance is within the range from 1 mm to 10 m.
11. The multicore fiber optical attenuator of any of examples 1-10, wherein crosstalk between optical fiber cores of said plurality of optical waveguides is not increased more than 3 dB by said attenuating section.
12. The multicore fiber optical attenuator of any of examples 1-11, wherein polarization-dependent loss is not increased more than 1 dB by said attenuating section.
13. The multicore fiber optical attenuator of any of examples 1-12, wherein return loss is not reduced more than 2 dB by said attenuating section.

14. The multicore fiber optical attenuator of any of examples 1-13, wherein said attenuating section is a helical structure having helical pitch and structure length.
15. The multicore fiber optical attenuator of example 14, wherein said helical structure has said pitch configured to reduce wavelength dependent loss.
16. The multicore fiber optical attenuator of example 14 or 15, wherein said helical structure has said structure length configured to achieve a desired optical loss.
17. A method of fabricating a multicore fiber optical attenuator configured to attenuate light traveling from at least one optical fiber core of a plurality of optical fiber cores of a first multicore optical fiber to at least one optical fiber core of a plurality of optical fiber cores of a second multicore optical fiber at least at one wavelength W−1, the method comprising:
  providing an elongated optical element having a first end and a second end, the first end configured to be optically coupled with said plurality of optical fiber cores of the first multicore optical fiber and the second end configured to be optically coupled with said plurality of optical fiber cores of the second multicore optical fiber, wherein providing said elongated optical element comprises:
    providing a plurality of optical waveguides; and
    forming an attenuating section within the plurality of optical waveguides,
    wherein providing said plurality of optical waveguides comprises providing a plurality of optical fiber cores configured to have at least one propagating optical mode at said wavelength W−1, and at least one of a radiation mode or higher order mode at said wavelength W−1,
    wherein forming said attenuating section comprises application of heat and/or mechanical manipulation to form a distorted portion of the plurality of optical waveguides, said distorted portion configured to couple said at least one propagating optical mode with said at least one of the radiation mode or higher order mode at said wavelength W−1.
18. The method of example 17, wherein said first end of said elongated optical element is configured to be optically coupled with each of said plurality of optical fiber cores of the first multicore optical fiber and said second end of said elongated optical element is configured to be optically coupled with each of said plurality of optical fiber cores of the second multicore optical fiber.
19. The method of any of examples 17-18, wherein forming said attenuating section comprises application of heat.
20. The method of any of examples 17-19, wherein said application of heat is one of pulsed and continuous heat.
21. The method of any of examples 17-20, wherein said heat is generated by one of an electrical arc discharge, electric resistive heater, and laser.
22. The method of any of examples 17-21, wherein forming said attenuating section comprises application of mechanical manipulation.
23. The method of any of examples 17-22, wherein said mechanical manipulation is at least one of fiber pulling, fiber compression, fiber twist, fiber rotation, fiber shift along the fiber axis, and fiber shift perpendicular to the fiber axis.
24. The method of any of examples 17-23, wherein forming said attenuating section comprises forming a multicore optical fiber-multicore optical fiber splice.
25. The method of any of examples 17-23, wherein forming said attenuating section comprises forming in a continuous section of a multicore optical fiber.
26. The method of any of examples 17-25, wherein forming said attenuating section comprises forming a helical structure having helical pitch and structure length.
27. The method of example 26, wherein said helical structure has said pitch configured to reduce wavelength dependent loss.
28. The method of example 26 or 27, wherein said helical structure has said structure length configured to achieve a desired optical loss.

DETAILED DESCRIPTION

Various implementations described herein provide a multicore fiber optical attenuator or multicore fiber (MCF) attenuator (MCF-ATT) configured to attenuate light traveling from at least one optical fiber core of a first MCF to at least one optical fiber core of a second MCF at least at one wavelength W−1 while providing or maintaining certain optical parameters. For example, a MCF-ATT can be designed to achieve a predefined optical attenuation in one or more cores (e.g., each core) of a MCF (e.g., 1+/−0.2 dB attenuation in core 1, 1+/−0.2 dB attenuation in core 2, 2+/−0.2 dB attenuation in core 3, and 2+/−0.2 dB attenuation in core 4) while reducing and/or minimizing distortion in other fiber link parameters, such as crosstalk (XT), polarization-dependent loss (PDL), and return loss (RL) (e.g., XT<−45 dB, 0<PDL<0.15, and RL>50 dB).

Various approaches of achieving fiber attenuation in single core fibers are based on absorbing the light or removing the light from the fiber core without a particular attention to where the removed light goes. In contrast, in MCFs, the scattered light will likely be coupled with other cores, resulting in increased XT. Also, in MCFs, the cores are off centered, so waveguide deformations may lead to a substantial increase in PDL.

In some multicore fiber attenuators described herein, XT is one of the important parameters. For instance, reducing and/or minimizing the XT while providing attenuation can be one of the main goals. In some instances, reducing and/or minimizing PDL while providing attenuation can also be a goal. In some further instances, increasing and/or maximizing RL while providing attenuation can be desirable.

Figure 1:
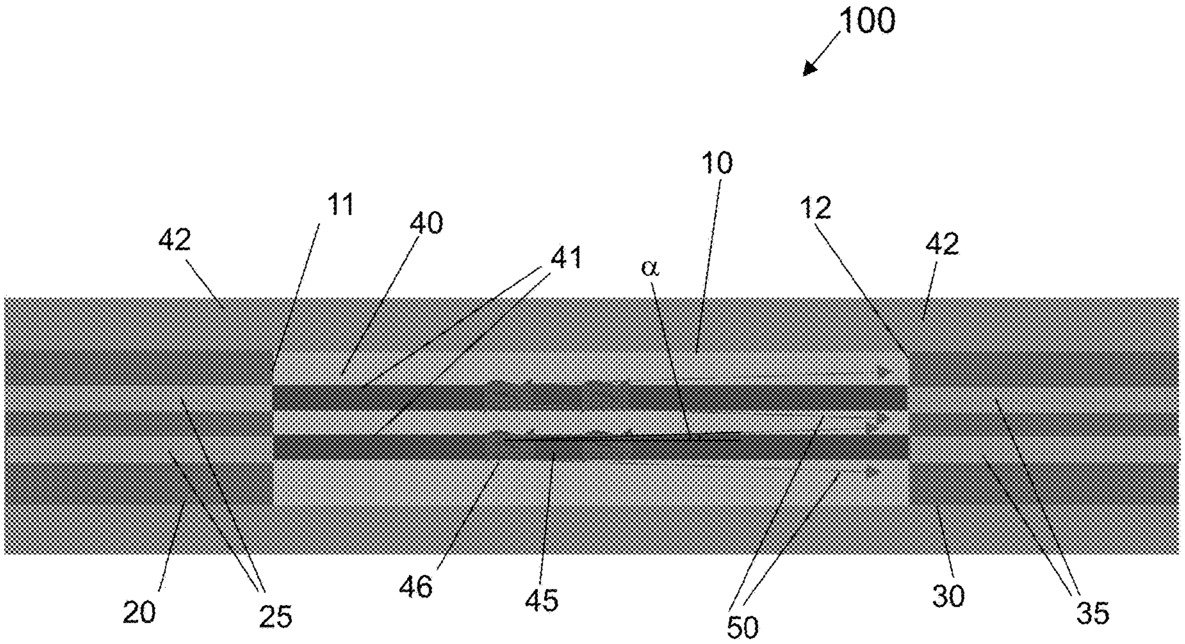
FIG. 1 schematically illustrates an example multicore optical fiber attenuator.

FIG. 1 schematically illustrates an example multicore optical fiber attenuator (MCF-ATT) in accordance with certain implementations described herein. As illustrated, the MCF-ATT 100 can include an elongated optical element 10 having a first end 11 and a second end 12. The first end 11 can be configured to be optically coupled with at least one of a plurality of optical fiber cores 25 (e.g, a plurality of optical fiber cores 25) of a first MCF 20 (e.g., an input MCF) and the second end 12 can be configured to be optically coupled with at least one of a plurality of optical fiber cores 35 (e.g., a plurality of optical fiber cores 35) of a second MCF 30 (e.g., an output MCF). The elongated optical element 10 can include a plurality of optical waveguides 40 and an attenuating section 45 (e.g., attenuator) within the plurality of optical waveguides 40. The attenuating section 45 can include one or more distorted portions 46 of the plurality of optical waveguides 40. The plurality of optical waveguides 40 can include a plurality of optical fiber cores 41, with at least one optical fiber core 41 (e.g., a plurality of optical fiber cores 41) configured to have or support at least one propagating optical mode at a wavelength W-1 and at least one radiation mode at the wavelength W-1.

The attenuation can be achieved by an optical waveguide distortion (e.g., by a distorted portion 46 of a waveguide 40) capable of coupling fiber propagation and radiation modes. For example, the distorted portion 46 can be configured to couple at least one propagation mode with at least one radiation mode at the wavelength W-1. The radiation mode 50 can then be gradually (e.g., over a length of a few millimeters, centimeters, or meters, or over a distance longer than or equal to 1 mm, longer than or equal to 2 mm, longer than or equal to 5 mm, or longer than or equal to 10 mm, or longer than or equal to 50 mm, or longer than or equal to 100 mm, or longer than or equal to 500 mm, or longer than or equal to 1 m, or longer than or equal to 5 m, or longer than or equal to 10 m, or shorter than or equal to 5 mm, or shorter than or equal to 100 mm, or shorter than or equal to 500 mm, or shorter than or equal to 1 m, or shorter than or equal to 5 m, or shorter than or equal to 10 m, or over a distance within a range formed by any of these values, for example, over a length within a range from 1 mm to 10 m, from 1 mm to 5 m, from 2 mm to 10 m, from 2 mm to 5 m, from 5 mm to 10 m, from 5 mm to 5 m, etc.) scattered from the core 41 and absorbed by the fiber coating 42 with little coupling or without being coupled to the other cores 41. The portion of the optical waveguides 40 or MCF where the radiation mode may potentially be coupled with other cores is generally not distorted (e.g., radiation mode "crosses" the other cores outside of the distorted portions 46). In various implementations, the provided attenuation can be in the range from 0.1 to 25 dB, or any range within this range, such as from 0.1 to 20 dB, from 0.1 to 15 dB, from 0.1 to 12 dB, from 0.1 to 10 dB, from 0.2 to 25 dB, from 0.2 to 20 dB, from 0.2 to 15 dB, from 0.2 to 12 dB, from 0.2 to 10 dB, from 0.3 to 25 dB, from 0.3 to 20 dB, from 0.3 to 15 dB, from 0.3 to 12 dB, from 0.3 to 10 dB, from 0.5 to 25 dB, from 0.5 to 20 dB, from 0.5 to 15 dB, from 0.5 to 12 dB, from 0.5 to 10 dB, from 1 to 20 dB, from 1 to 15 dB, from 1 to 12 dB, from 1 to 10 dB, etc.

In various implementations, the MCF-ATT 100 can include a portion of the first MCF 20 and a portion of the second MCF 30. For example, The MCF-ATT 100 may include a portion of the first MCF 20 adjacent the first end 11 of the elongated optical element 10 and a portion of the second MCF 30 adjacent to the second end 12 of the elongated optical element 10. In some such designs, the attenuating section 45 can be fusion-spliced to the first and/or second MCFs 20, 30 (e.g., the input and/or output MCF). For example, the attenuating section 45 can include a MCF-to-MCF splice (e.g., a splice at the first end 11 and/or second end 12). In other implementations, the MCF-ATT 100 may comprise a continuous section of a MCF. For example, the MCF-ATT 100 may be implemented directly in a continuous section of a MCF.

The number of optical fiber cores 25, 35 of the first and/or second MCF 20, 30 is not particularly limited. For example, the number of optical fiber cores 25, 35 of the first and/or second MCF can be in the range from 2 to 100 (for example, 2, 3, 4, 5, 6, 7, 8, 9, 10, 20, 25, 26, 27, 30, 35, 36, 37, 40, 45, 46, 47, 50, 60, 70, 80, 90, 100, etc.), or any range within this range (for example, from 2 to 50, from 2 to 40, from 2 to 37, etc.) In some instances, the number of optical fiber cores 25, 35 of the first and/or second MCF can be greater than 100, such as in the range from 100 to 200 (for example, 102, 110, 120, 150, etc.). The first and/or second MCF 20, 30 can be any MCF known in the art or yet to be developed. The plurality of optical waveguides 40 of the elongated optical element 10 can include any optical waveguide known in the art or yet to be developed. For example, the optical waveguides 40 can include a plurality of optical fiber cores 41 of a MCF. As another example, the optical waveguides 40 can include a plurality of optical fiber cores 41 of a plurality of single core fibers. In various implementations, the number of optical fiber cores 41 of the optical waveguides 40 can equal the number of optical fiber cores 25, 35 of the first and/or second MCF 20, 30. For example, the number of optical fiber cores 25 of the first MCF 20 can equal the number of optical fiber cores 41 of the optical waveguides 40 of the elongated optical element 10 and/or the number of optical fiber cores 35 of the second MCF 30 can equal the number of optical fiber cores 41 of the optical waveguides 40 of the elongated optical element 10. In other examples, the number of optical fiber cores 41 of the optical waveguides 40 might not equal the number of optical fiber cores 25, 35 of the first MCF 20 and/or the second MCF 30.

As described herein, the optical fiber cores 41 of the optical waveguides 40 can be configured to have or support at least one propagating optical mode at wavelength W-1 and at least one radiation mode at the wavelength W-1. The attenuating section 45 can include a distorted portion 46 of the optical waveguides 41. The distorted portion 46 can be configured to couple at least one propagating mode with at least one radiation mode at the wavelength W-1.

In some instances, the optical waveguides 40 can have different order modes (e.g., a lowest order mode and one or more higher order modes) and the distorted portion 46 can be configured to couple the different order modes (e.g., the lowest order mode with a higher order mode). As an example, in the case of a quasi-single mode fiber, the waveguide distortion may couple the fundamental propagation mode (e.g., the lowest order mode) with a weakly guided second mode and/or other higher order modes, which are more sensitive to waveguide deformations and become gradually scattered from the core 41 as well. In various instances, the weakly guided mode and/or other higher order mode can become a radiation mode. The weakly guided and/or higher order mode can be scattered by the waveguide distortions in the distorted portion 46. In various instances, the weakly guided and/or higher order mode can be scattered by the distorted portion 46 and absorbed by the fiber coating 42.

The scattering angle $\alpha$ of the higher order mode and/or radiation mode 50 can be sufficiently small to allow scattered light crossing other cores 41 outside the distorted attenuating section 45, which can reduce and/or minimize light coupling to the other cores 41. In various instances, the scattering angle $\alpha$ can be less than or equal to 0.2 degree. For example, the scattering angle $\alpha$ can be in a range from 0.01 to 0.2 degree or any range within this range such as from 0.01 to 0.19 degree, from 0.01 to 0.18 degree, from 0.01 to 0.17 degree, from 0.02 to 0.2 degree, from 0.02 to 0.19 degree, from 0.02 to 0.18 degree, from 0.02 to 0.17 degree, from 0.03 to 0.2 degree, from 0.03 to 0.19 degree, from 0.03 to 0.18 degree, from 0.03 to 0.17 degree, etc. Reducing and/or minimizing light coupling to other cores 41 can allow for light attenuation without compromising the XT. For example, in various implementations, the XT between optical fiber cores 41 is not increased more than 3 dB (e.g., XT between optical fiber cores increases only within the range from 0 to 3 dB by the attenuating section 45). As another example, the XT between optical fiber cores 41 is not increased more than 2 dB (e.g., XT between optical fiber cores increases only within the range from 0 to 2 dB by the attenuating section 45). As another example, the XT between optical fiber cores 41 is not increased more than 1 dB (e.g., XT between optical fiber cores increases only within the range from 0 to 1 dB by the attenuating section 45). In some instances, the XT can be relatively small (e.g., XT≤−45 dB). Other examples are possible.

In order to preserve the PDL, the distorted portion 46 may include multiple microbendings in different directions and/or circularly-symmetric core-diameter fluctuations. In various implementations, the PDL is not increased more than 1 dB (e.g., PDL increases only within the range from 0 to 1 dB by the attenuating section 45). As an example, the PDL is not increased more than 0.5 dB (e.g., PDL increases only within the range from 0 to 0.5 dB by the attenuating section 45). As another example, the PDL is not increased more than 0.1 dB (e.g., PDL increases only within the range from 0 to 0.1 dB by the attenuating section 45). As another example, the PDL is not increased more than 0.05 dB (e.g., PDL increases only within the range from 0 to 0.05 dB by the attenuating section 45). In some instances, the PDL can be relatively small (e.g., 0≤PDL≤0.15 dB). Other examples are possible. Since a severe amplitude of both microbending and diameter fluctuations may reduce the RL, the amplitude and number of the distortions can be improved and/or optimized to achieve the desired amplification without significant RL reduction. In various implementations, the RL is not reduced more than 2 dB (e.g., RL reduced only within the range from 0 to 2 dB by the attenuating section 45). As another example, the RL is not reduced more than 1 dB (e.g., RL reduced only within the range from 0 to 1 dB by the attenuating section 45). In some instances, the RL can be relatively large (e.g., RL≥50 dB). Other examples are possible.

In certain implementations, the distorted portion 46 of the attenuating section 45 can include waveguide microbending and/or waveguide diameter changes to attenuate light. In some implementations, distortions based on microbending can have a bend radius smaller than a critical bend radius. For example, the distortions based on microbending can have a bend radius in the range from 0.01 mm to 50 mm, or any range within this range such as 0.01 mm to 40 mm, 0.01 mm to 30 mm, 0.01 mm to 20 mm, 0.01 mm to 10 mm, 0.01 mm to 5 mm, from 0.01 mm to 4 mm, from 0.01 mm to 3 mm, from 0.01 mm to 2 mm, 0.02 mm to 50 mm, 0.02 mm to 40 mm, 0.02 mm to 30 mm, 0.02 mm to 20 mm, 0.02 mm to 10 mm, from 0.02 mm to 5 mm, 0.05 mm to 50 mm, 0.05 mm to 40 mm, 0.05 mm to 30 mm, 0.05 mm to 20 mm, 0.05 mm to 10 mm, from 0.05 mm to 5 mm, 1 mm to 50 mm, 1 mm to 40 mm, 1 mm to 30 mm, 1 mm to 20 mm, 1 mm to 10 mm, from 1 mm to 5 mm, etc. An example distorted portion 46 can include a helical or chiral structure, e.g., which is capable of coupling the lowest order mode and a higher order mode or a radiation mode. The helical structure can have a pitch and structure length. The pitch can be configured to reduce and/or minimize wavelength dependent loss. The structure length can be configured and/or optimized to achieve a desired optical loss. In some instances, the helical structure may have a helical pitch in the range of 50 to 5000 microns, 50 to 4000 microns, 50 to 3000 microns, 50 to 2000 microns, etc. The length of the structure can determine the resulting attenuation and may be in the range of 0.05 to 10 pitches, 0.05 to 8 pitches, 0.05 to 5 pitches, etc. For example, a 10 dB attenuator may have a helical structure with the helical pitch of ~ 1 mm and be about 900 microns long, while 5 dB attenuator may be 400 microns long with the same pitch.

In various implementations of the MCF-ATT 100, the attenuating section 45 can provide substantially uniform attenuation across the plurality of optical fiber cores 41. For example, the attenuating section 45 can provide an attenuation in each core that is within +/−0.2 dB of each other, or any range within this range such as +/−0.15 dB, +/−0.1 dB, etc. As an example, in some designs of the MCF-ATT 100, the attenuating section 45 can provide substantially uniform attenuation (e.g., 2+/−0.2 dB attenuation in each core 41) across the plurality of optical fiber cores 41 while substantially preserving crosstalk (e.g., XT not increased more than 3 dB), polarization-dependent loss (e.g., PDL not increased more than 1 dB such as not increased more than 0.1 dB), and/or return loss (e.g., RL not reduced more than 2 dB).

In various implementations of the MCF-ATT 100, the attenuating section 45 can provide substantially non-uniform attenuation across the plurality of optical fiber cores 41. For example, in some designs of the MCF-ATT 100, the attenuating section 45 can provide substantially non-uniform attenuation (e.g., 2+/−0.2 dB attenuation in one core and 3+/−0.2 dB in another core) across the plurality of optical fiber cores 41 while substantially preserving crosstalk (e.g., XT not increased more than 3 dB), polarization-dependent loss (e.g., PDL not increased more than 1 dB such as not increased more than 0.1 dB), and/or return loss (e.g., RL not reduced more than 2 dB).

The created attenuation may be equal for all the fiber cores 41 if the core distances to the center of the fiber are the same, as, for example, in the square lattice 4-core MCF. In another example of hexagonal lattice 7-core fiber, the central core attenuation may be smaller than that of the side cores 41. Other examples are possible.

Figure 2:
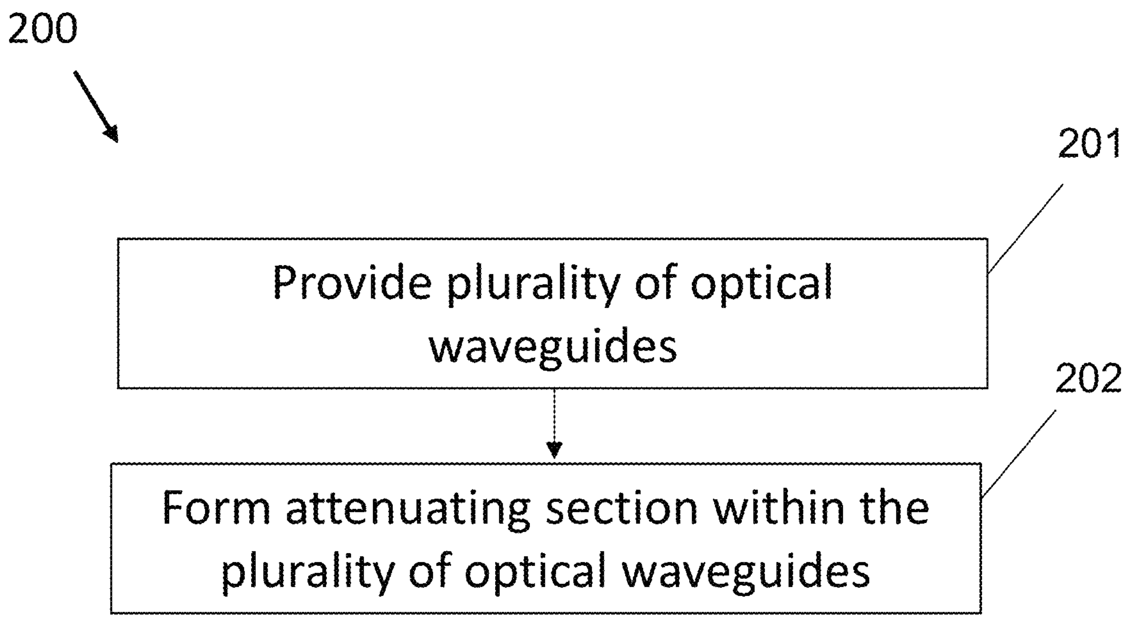
FIG. 2 schematically illustrates an example method of fabricating a multicore optical fiber attenuator.

FIG. 2 schematically illustrates an example method of fabricating a multicore optical fiber attenuator (MCF-ATT). The example method 200 can fabricate a MCF-ATT 100 as described herein with respect to FIG. 1. For example, with reference to FIG. 1, the fabricated MCF-ATT 100 can be configured to attenuate light traveling from at least one optical fiber core of a first MCF 20 to at least one optical fiber core of a second MCF 30. The MCF-ATT 10 can include an elongated optical element 10 having a first end 11 and a second end 12. The first end 11 can be configured to be optically coupled with at least one optical fiber core of a plurality of optical fiber cores 25 (e.g., a plurality of optical fiber cores 25) of a first MCF 20 and the second end 12 can be configured to be optically coupled with at least one optical fiber core of a plurality of optical fiber cores 35 (e.g., a plurality of optical fiber cores 35) of a second MCF 30.

With reference to FIG. 2, the method 200 can provide a method of forming the elongated optical element 10. The method 200 can include providing a plurality of optical waveguides as shown in operational block 201. The provided optical waveguides can be a plurality of optical fiber cores of a MCF. As another example, the provided optical waveguides can be a plurality of optical fiber cores of a plurality of single core fibers. In certain implementations, the plurality of optical waveguides can include a plurality of optical fiber cores, with at least one optical fiber core (e.g., a plurality of optical fiber cores) configured to have or support at least one propagating optical mode at a wavelength W−1 and at least one of a radiation mode or higher order mode at the wavelength W−1. The method 200 can also include forming an attenuating section within the plurality of optical waveguides as shown in operational block 202.

Forming the attenuating section can include application of heat and/or mechanical manipulation to form one or more distorted portions of the plurality of optical waveguides. In various implementations, the distorted portions can include physical distortions of one or more cores of the plurality of optical waveguides. In some instances, the distorted portions can include physical distortions of one or more of an entire optical waveguide (e.g., core and cladding) of the plurality of optical waveguides. Example distortions include changes in thickness, changes in diameter, bends, twists, and/or surface variations. In some implementations, the perturbation amplitude of the optical waveguide, for example, fluctuations in these changes, can be in a range from 1/20 to 5 times the wavelength W−1, or any range within this range (e.g., 1/20 to 4 times the wavelength W−1, 1/20 to 3 times the wavelength W−1, etc.). Another example distortion can include variations in index of refraction. The distorted portion can be configured to couple at least one propagation mode with at least one radiation mode at the wavelength W−1. As described herein, alternatively or additionally, the distorted portion can be configured to couple a lowest order mode with one or more higher order modes.

The waveguide distortion (e.g., waveguide microbending, and/or waveguide diameter modifications) can be achieved by applying heat to a section of the MCF with or without mechanical movement. The mechanical movement may include fiber pulling, fiber compression, fiber twist, fiber rotation, fiber shift along the fiber axis (e.g., tapering), and fiber shift perpendicular to the fiber axis (e.g., microbending). A fiber shift can include lateral or longitudinal shift with the following fiber re-heating. It can create a fiber microbending capable of some light scattering. In some examples, a helical or chiral structure can be created by simultaneous or sequential fiber twisting, shifting along the fiber axis, and heating. The waveguide distortion (e.g., index of refraction variations) can also be achieved with ultraviolet (UV) light selectively irradiating the cores of the optical waveguides to modify their refractive indices and induce attenuation. With respect to FIG. 1, the MCF-ATT 100 may be implemented directly in a continuous section of a MCF or may include a section 45 where the input and/or output MCFs 20, 30 are fusion spliced, e.g., attenuating section 45 includes an MCF-to-MCF splice. The applied heat for making perturbations in the attenuating section may be continuous or pulsed. The heat can be generated by one of an electrical arc discharge, electric resistive heater, and/or laser. In some cases, the performance of each core may be actively monitored during the fabrication process to achieve the desired attenuation. As an example, by axially rotating the optical waveguides with respect to the heat source (e.g., one or more electrodes), relative distortions in the different cores can be controlled (e.g., producing even or uneven attenuation). The diameter of the coating 42 of the attenuator may be substantially the same as the coating diameter of the MCF, or it may be smaller or larger without affecting optical properties.

Figure 3A:
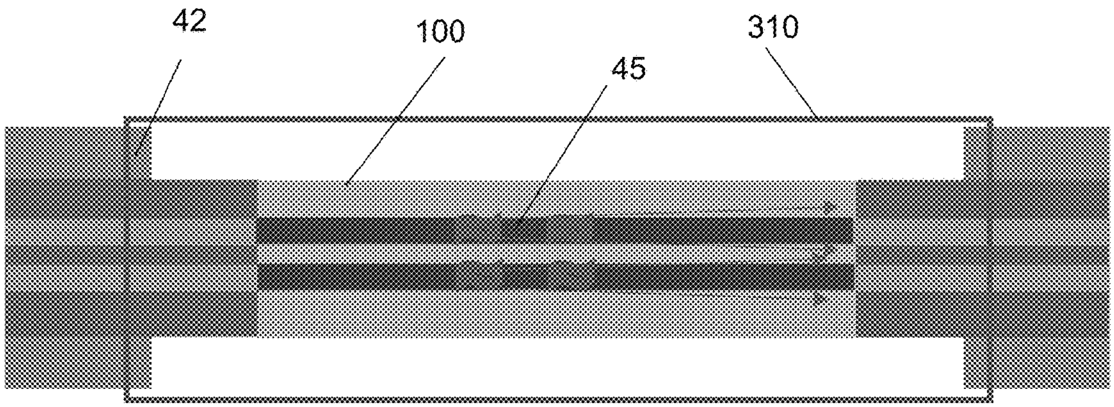
FIGS. 3A, 3B, and 3C schematically illustrate an example method of packaging a multicore optical fiber attenuator.
Figure 3B:
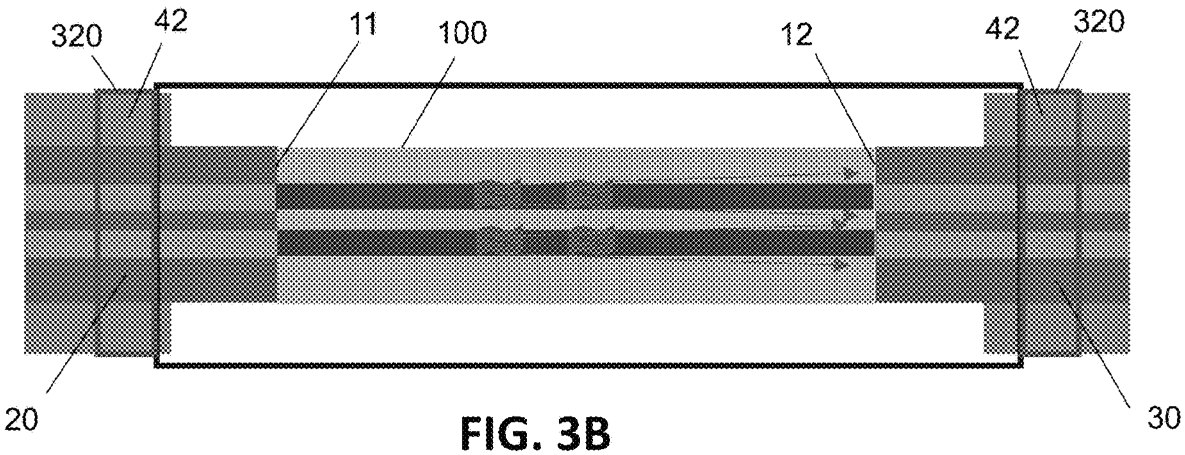
Figure 3C:
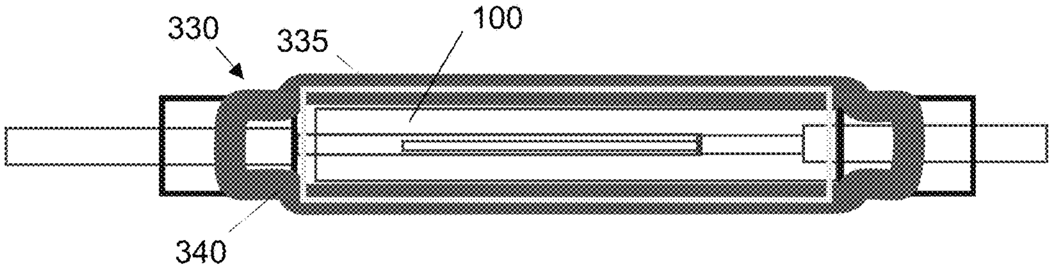

The MCF-ATT 100 may be protected by a rigid enclosure to avoid bend sensitivity. FIGS. 3A, 3B, and 3C schematically illustrate an example method of packaging a MCF-ATT. As shown in FIG. 3A, the MCF-ATT 100 can be placed within a splice protector 310. The splice protector 310 can be any splice protector known in the art or yet to be developed. For example, the splice protector can be an EVA or ethylene vinyl acetate splice protector. In some instances a portion of the coating 42 can be removed prior to installing the splice protector 310 over at least the attenuating section 45. As shown in FIG. 3B, furcation tubes 320 can be attached over the coated MCF fibers 20, 30 near one or both ends 11, 12 of the elongated optical element 10 of the MCF-ATT 100. In some instances, the furcation tubes 320 can be 900 micron furcation tubes 320. Some such furcation tubes 320 can be 10 mm long. Other examples are possible. As shown in FIG. 3C, a protective sleeve 330 can be installed over the MCF-ATT 100. The protective sleeve 330 can include a stainless steel tube 335 inside a polymeric sleeve 340.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A multicore fiber optical attenuator configured to attenuate light traveling from at least one optical fiber core of a plurality of optical fiber cores of a first multicore optical fiber to at least one optical fiber core of a plurality of optical fiber cores of a second multicore optical fiber at least at one wavelength W−1, the multicore fiber optical attenuator comprising:

an elongated optical element having a first end and a second end, the first end configured to be optically coupled with said plurality of optical fiber cores of the first multicore optical fiber and the second end configured to be optically coupled with said plurality of optical fiber cores of the second multicore optical fiber, said elongated optical element comprising:

a plurality of optical waveguides; and an attenuating section within the plurality of optical waveguides, wherein said plurality of optical waveguides comprises a plurality of optical fiber cores configured to have at least one propagating optical mode at said wavelength W−1, and at least one of a radiation mode or higher order mode at said wavelength W−1, wherein said attenuating section comprises a distorted portion of the plurality of optical waveguides, said distorted portion configured to couple said at least one propagating optical mode with said at least one of the radiation mode or higher order mode at said wavelength W−1.

2. The multicore fiber optical attenuator of claim 1, wherein said first end of said elongated optical element is configured to be optically coupled with each of said plurality of optical fiber cores of the first multicore optical fiber and said second end of said elongated optical element is configured to be optically coupled with each of said plurality of optical fiber cores of the second multicore optical fiber.

3. The multicore fiber optical attenuator of claim 1, wherein said distorted portion is configured to couple said at least one propagating optical mode with said radiation mode.

4. The multicore fiber optical attenuator of claim 1, wherein said at least one propagating optical mode comprises a lowest order mode, and wherein said distorted portion is configured to couple said lowest order mode with said higher order mode, and wherein said distorted portion is further configured to scatter said higher order mode.

5. The multicore fiber optical attenuator of claim 1, wherein said attenuating section provides substantially uniform attenuation across said plurality of optical fiber cores of said plurality of optical waveguides.

6. The multicore fiber optical attenuator of claim 1, wherein said attenuating section provides non-uniform attenuation across said plurality of optical fiber cores of said plurality of optical waveguides.

7. The multicore fiber optical attenuator of claim 1, wherein said attenuating section comprises a multicore optical fiber-multicore optical fiber splice.

8. The multicore fiber optical attenuator of claim 1, wherein said attenuating section comprises a continuous section of a multicore optical fiber.

9. The multicore fiber optical attenuator of claim 1, wherein said distorted portion is configured such that said at least one of the radiation mode or higher order mode is scattered and absorbed by a fiber coating.

10. The multicore fiber optical attenuator of claim 1, wherein said at least one of the radiation mode or higher order mode radiates from one of said plurality of optical waveguides over a scattering distance, wherein said scattering distance is within the range from 1 mm to 10 m.

11. The multicore fiber optical attenuator of claim 1, wherein crosstalk between optical fiber cores of said plurality of optical waveguides is not increased more than 3 dB by said attenuating section.

12. The multicore fiber optical attenuator of claim 1, wherein polarization-dependent loss is not increased more than 1 dB by said attenuating section.

13. The multicore fiber optical attenuator of claim 1, wherein return loss is not reduced more than 2 dB by said attenuating section.

14. The multicore fiber optical attenuator of claim 1, wherein said attenuating section is a helical structure having helical pitch and structure length.

15. The multicore fiber optical attenuator of claim 14, wherein said helical structure has said pitch configured to reduce wavelength dependent loss.

16. The multicore fiber optical attenuator of claim 14, wherein said helical structure has said structure length configured to achieve a desired optical loss.

17. A method of fabricating the multicore fiber optical attenuator of claim 1, the method comprising:

providing the elongated optical element having the first end and the second end, wherein providing said elongated optical element comprises:
  providing the plurality of optical waveguides; and
  forming the attenuating section within the plurality of optical waveguides,
  wherein providing said plurality of optical waveguides comprises providing the plurality of optical fiber cores,
  wherein forming said attenuating section comprises application of heat and/or mechanical manipulation to form the distorted portion of the plurality of optical waveguides.

18. The method of claim 17, wherein forming said attenuating section comprises application of heat.

19. The method of claim 18, wherein said application of heat is one of pulsed and continuous heat.

20. The method of claim 17, wherein said heat is generated by one of an electrical arc discharge, electric resistive heater, and laser.

21. The method of claim 17, wherein forming said attenuating section comprises application of mechanical manipulation.

22. The method of claim 21, wherein said mechanical manipulation is at least one of fiber pulling, fiber compression, fiber twist, fiber rotation, fiber shift along the fiber axis, and fiber shift perpendicular to the fiber axis.

23. The method of claim 17, wherein forming said attenuating section comprises forming a multicore optical fiber-multicore optical fiber splice.

24. The method of claim 17, wherein forming said attenuating section comprises forming in a continuous section of a multicore optical fiber.

25. The method of claim 17, wherein forming said attenuating section comprises forming a helical structure having helical pitch and structure length.

* * * * *